(12) United States Patent
Arimilli et al.

(10) Patent No.: US 6,272,603 B1
(45) Date of Patent: Aug. 7, 2001

(54) CACHE COHERENCY PROTOCOL HAVING HOVERING (H), RECENT (R), AND TAGGED (T) STATES

(75) Inventors: Ravi Kumar Arimilli, Austin; John Steven Dodson, Pflugerville; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/024,319

(22) Filed: Feb. 17, 1998

(51) Int. Cl.$^7$ ...................................... G06F 12/08
(52) U.S. Cl. ................. 711/146; 711/142; 711/144; 711/145; 711/130
(58) Field of Search ................... 711/144, 146, 711/122, 130, 143, 142, 145, 133

(56) References Cited

U.S. PATENT DOCUMENTS

| | | | |
|---|---|---|---|
| 5,119,485 | * | 6/1992 | Ledbetter, Jr. et al. ............. 711/146 |
| 5,274,787 | | 12/1993 | Hirano et al. ........................ 711/143 |
| 5,282,272 | | 1/1994 | Guy et al. ............................. 709/207 |

(List continued on next page.)

FOREIGN PATENT DOCUMENTS

| | | |
|---|---|---|
| 0378399A2 | 7/1990 | (EP) . |
| 0438211A2 | 7/1991 | (EP) . |
| 0498556A2 | 6/1992 | (EP) . |
| 0681241A1 | 11/1995 | (EP) . |
| 2178205A | 2/1987 | (GB) . |
| 3253963S | 11/1991 | (JP) . |
| 06110785 | 4/1994 | (JP) . |
| 06110844A | 4/1994 | (JP) . |

OTHER PUBLICATIONS

Jim Handy, The Cache Memory Book, 1998, p. 151.*
Handy, The Cache Memory Book, 1998, 1993, pp. 65–66.*
Jim Handy, The Cache Memory Book, 1998, pp. 166–167.*
Hamaguchi et al., "Proposal of a Revalidating–Type Multi–Cache Consistency Protocol and Its Evaluation", Canon, Inc., pp. 115–120, 1990.
Eggers et al., "Evaluating the Performance of Four Snooping Cache Coherency Protocols," Computer Architecture Conference Proceedings, Washington, No. 3, Jun. 17, 1989, pp. 2–15.

*Primary Examiner*—Matthew Kim
*Assistant Examiner*—B. Peugh
(74) *Attorney, Agent, or Firm*—Volel Emile; Bracewell & Patterson, L.L.P.

(57) ABSTRACT

A cache and method of maintaining cache coherency in a data processing system are described. The data processing system includes a system memory, a plurality of processors, and a plurality of caches coupled to an interconnect. According to the method, a first data item is stored in a first of the caches in association with an address tag indicating an address of the first data item. A coherency indicator in the first cache is set to a first state that indicates that the address tag is valid and that the first data item is invalid. If, while the coherency indicator is set to the first state, the first cache receives a data transfer on the interconnect associated with the address indicated by the address tag, where the data transfer includes a second data item that is modified with respect to a corresponding data item in the system memory, the second data item is stored in the first cache in association with the address tag. In addition, the coherency indicator is updated to a second state indicating that the second data item is valid and that the first cache is responsible for writing back the second data item to system memory.

21 Claims, 5 Drawing Sheets

U.S. PATENT DOCUMENTS

| | | | |
|---|---|---|---|
| 5,287,484 | 2/1994 | Nishii et al. | 711/144 |
| 5,319,766 * | 6/1994 | Thaller et al. | 711/146 |
| 5,522,057 * | 5/1996 | Lichy | 711/144 |
| 5,551,001 | 8/1996 | Cohen et al. | 711/122 |
| 5,588,131 * | 12/1996 | Borrill | 711/146 |
| 5,598,550 | 1/1997 | Shen et al. | 711/146 |
| 5,666,509 | 9/1997 | McCarthy et al. | 711/206 |
| 5,671,391 * | 9/1997 | Knotts | 711/143 |
| 5,737,757 | 4/1998 | Hassoun et al. | 711/145 |
| 5,900,016 * | 5/1999 | Ghosh | 711/143 |
| 6,014,728 | 1/2000 | Baror | 711/133 |
| 6,038,644 | 3/2000 | Irie et al. | 711/141 |
| 6,049,849 | 4/2000 | Arimilli et al. | 711/133 |

* cited by examiner

CACHE COHERENCY PROTOCOL HAVING HOVERING (H), RECENT (R), AND TAGGED (T) STATES

CROSS-REFERENCE TO RELATED APPLICATIONS

The present application is related to the following commonly assigned co-pending applications:

(1) U.S. application Ser. No. 09/024,393;

(2) U.S. application Ser. No. 09/024,610;

(3) U.S. application Ser. No. 09/024,609;

(4) U.S. application Ser. No. 09/024,322;

(5) U.S. application Ser. No. 09/024,612;

(6) U.S. application Ser. No. 09/024,613;

(7) U.S. application Ser. No. 09/024,611; and (8) U.S. application Ser. No. 09/024,318; filed Feb. 17, 1998 patented U.S. Pat. No. 6,192,451.

BACKGROUND OF THE INVENTION

1. Technical Field

The present invention relates in general to a method and system for data processing and in particular to a method and system for maintaining cache coherency in a multiprocessor data processing system. Still more particularly, the present invention relates to an improved cache coherency protocol for a multiprocessor data processing system, which supports shared intervention of data, efficient allocation of responsibility for writing back modified cache lines to system memory, and automatic updates of invalid data in response to snoop hits.

2. Description of the Related Art

In a conventional symmetric multiprocessor (SMP) data processing system, all of the processors are generally identical, that is, the processors all utilize common instruction sets and communication protocols, have similar hardware architectures, and are generally provided with similar memory hierarchies. For example, a conventional SMP data processing system may comprise a system memory, a plurality of processing elements that each include a processor and one or more levels of cache memory, and a system bus coupling the processing elements to each other and to the system memory. To obtain valid execution results in an SMP data processing system, it is important to maintain a coherent memory hierarchy, that is, to provide a single view of the contents of memory to all of the processors.

A coherent memory hierarchy is maintained through the use of a selected memory coherency protocol, such as the MESI protocol. In the MESI protocol, an indication of a coherency state is stored in association with each coherency granule (e.g., cache line or sector) of at least all upper level (cache) memories. Each coherency granule can have one of four states, modified (M), exclusive (E), shared (S), or invalid (I), which is indicated by two bits in the cache directory. The modified state indicates that a coherency granule is valid only in the cache storing the modified coherency granule and that the value of the modified coherency granule has not been written to system memory. When a coherency granule is indicated as exclusive, the coherency granule is resident in, of all caches at that level of the memory hierarchy, only the cache having the coherency granule in the exclusive state. The data in the exclusive state is consistent with system memory, however. If a coherency granule is marked as shared in a cache directory, the coherency granule is resident in the associated cache and in at least one other cache at the same level of the memory hierarchy, all of the copies of the coherency granule being consistent with system memory. Finally, the invalid state indicates that the data and address tag associated with a coherency granule are both invalid.

The state to which each coherency granule (e.g., cache line) is set is dependent upon both a previous state of the cache line and the type of memory access sought by a requesting processor. Accordingly, maintaining memory coherency in the multiprocessor data processing system requires that the processors communicate messages across the system bus indicating their intention to read or write memory locations. For example, when a processor desires to write data to a memory location, the processor must first inform all other processing elements of its intention to write data to the memory location and receive permission from all other processing elements to carry out the write operation. The permission messages received by the requesting processor indicate that all other cached copies of the contents of the memory location have been invalidated, thereby guaranteeing that the other processors will not access stale local data. This exchange of messages is known as cross-invalidation (XI).

The present invention includes a recognition that while cross-invalidation of cache entries serves to maintain memory coherency in a SMP data processing system, the invalidation of cache entries by remote processors adversely affects data processing system performance by decreasing hit ratios in local caches. Thus, even if equipped with large local caches, a processing element can incur long access latencies when retrieving data that were once resident in a local cache from either a remote cache in another processing element or from system memory. As should thus be apparent, it would be desirable to provide a method and system for maintaining memory coherency in a SMP data processing system that reduces the performance penalty incurred as a result of the cross-invalidation of cache entries.

The present invention also includes a recognition that the conventional MESI protocol does not support efficient retrieval of data stored in remote caches. Although some known multiprocessor data processing systems support so-called modified intervention, which permits a remote cache storing data in the modified state to supply the modified data in response to a read request, the MESI protocol does not allocate responsibility for sourcing data to another processing element when the requested data is in the shared state. Thus, although requested data may be stored in multiple remote caches at a relatively low access latency, in conventional multiprocessor data processing systems shared data must always be retrieved from system memory. It would therefore be desirable to provide an improved cache coherency protocol that supports shared intervention.

In conventional multiprocessor data processing systems that support modified intervention, modified data is written back to system memory each time the modified data is sourced to another cache across the shared bus. The present invention includes a recognition that while this procedure does maintain coherency between system memory and cache memory, it consumes a portion of the limited bandwidth of the system memory in order to perform a write operation that may be unnecessary. For example, if a modified cache line is sourced by a first cache to a second cache in response to a read request, the data in the second cache is likely to be modified again, thus requiring another write to system memory. If no other request for the cache line is issued between the time of the second cache's read request and subsequent modification of the cache line, then the write to system memory concomitant with modified intervention by the first cache is superfluous.

One possible method for reducing unnecessary write backs to system memory would be to mark data as invalid in the sourcing cache and as modified in the requesting cache, even if the requesting cache only made a read request. In this manner, the requested data need not be written back to system memory in conjunction with modified intervention. However, this method of maintaining cache coherency does not permit sharing of modified data between processors and would create additional bus traffic as data is passed between caches. It would therefore be desirable to provide an improved cache coherency protocol that supports efficient writeback of data to system memory while permitting modified data to be shared between caches.

SUMMARY OF THE INVENTION

It is therefore one object of the present invention to provide an improved method and system for data processing.

It is another object of the present invention to provide an improved method and system for maintaining cache coherency in a multiprocessor data processing system.

It is yet another object of the present invention to provide a cache coherency protocol for a multiprocessor data processing system, which supports shared intervention of data, efficient allocation of responsibility for writing back modified cache lines to system memory, and automatic updates of invalid data in response to snoop hits.

The foregoing objects are achieved as is now described. A data processing system is provided that includes a system memory, a plurality of processors, and a plurality of caches coupled to an interconnect. In accordance with the method of the present invention, a first data item is stored in a first of the caches in association with an address tag indicating an address of the first data item. A coherency indicator in the first cache is set to a first state that indicates that the address tag is valid and that the first data item is invalid. If, while the coherency indicator is set to the first state, the first cache receives a data transfer on the interconnect associated with the address indicated by the address tag, where the data transfer includes a second data item that is modified with respect to a corresponding data item in the system memory, the second data item is stored in the first cache in association with the address tag. In addition, the coherency indicator is updated to a second state indicating that the second data item is valid and that the first cache is responsible for writing back the second data item to the system memory.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
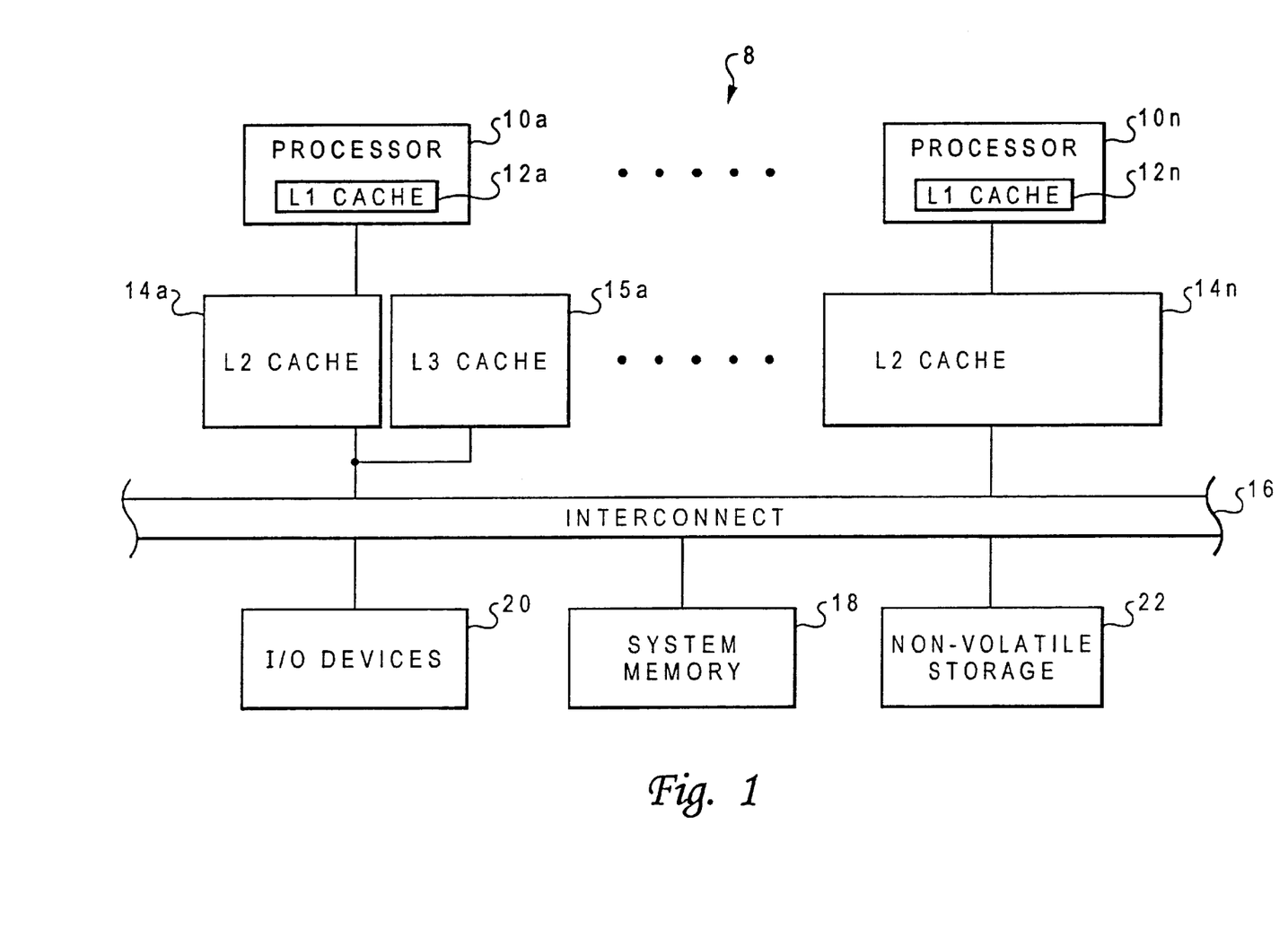
FIG. 1 depicts an illustrative embodiment of a multiprocessor data processing system in accordance with the present invention.

With reference now to the figures, and in particular with reference to FIG. 1, there is illustrated a high level block diagram of a multiprocessor data processing system in accordance with the present invention. As depicted, data processing system 8 includes a number of processors 10a–10n, which each preferably comprise one of the PowerPC™ line of processors available from International Business Machines Corporation. In addition to the conventional registers, instruction flow logic and execution units utilized to execute program instructions, each of processors 10a–10n also includes an associated one of on-board level one (L1) caches 12a–12n, which temporarily stores instructions and data that are likely to be accessed by the associated processor. Although L1 caches 12a–12n are illustrated in FIG. 1 as unified caches that store both instruction and data (both referred to hereinafter simply as data), those skilled in the art will appreciate that each of L1 caches 12a–12n could alternatively be implemented as bifurcated instruction and data caches.

In order to minimize data access latency, data processing system 8 also includes one or more additional levels of cache memory, such as level two (L2) caches 14a–14n, which are utilized to stage data to L1 caches 12a–12n. In other words, L2 caches 14a–14n function as intermediate storage between system memory 18 and L1 caches 12a–12n, and can typically store a much larger amount of data than L1 caches 12a–12n, but at a longer access latency. For example, L2 caches 14a–14n may have a storage capacity of 256 or 512 kilobytes, while L1 caches 12a–12n may have a storage capacity of 64 or 128 kilobytes. Processor 10a is further supported by a lookaside L3 cache 15a, which is connected to interconnect 16 in parallel with L2 cache 14a and preferably has a storage capacity equal to or greater than L2 cache 14a.

As illustrated, data processing system 8 further includes I/O devices 20, system memory 18, and non-volatile storage 22, which are each coupled to interconnect 16. I/O devices 20 comprise conventional peripheral devices, such as a display device, keyboard, and graphical pointer, which are interfaced to interconnect 16 via conventional adapters. Non-volatile storage 22 stores an operating system and other software, which are loaded into volatile system memory 18 in response to data processing system 8 being powered on. Of course, those skilled in the art will appreciate that data processing system 8 can include many additional components that are not shown in FIG. 1, such as serial and parallel ports for connection to networks or attached devices, a memory controller that regulates access to system memory 18, etc.

Interconnect 16, which can comprise one or more buses or a cross-point switch, serves as a conduit for communication transactions between L2 caches 14a–14n, L3 cache 15a, system memory 18, input/output (I/O) devices 20, and non-volatile storage 22. A typical communication transaction on interconnect 16 includes a source tag indicating the source of the transaction, a destination tag specifying the intended recipient of the transaction, an address and/or data. Each device connected to interconnect 16 preferably snoops all communication transactions on interconnect 16.

Figure 2:
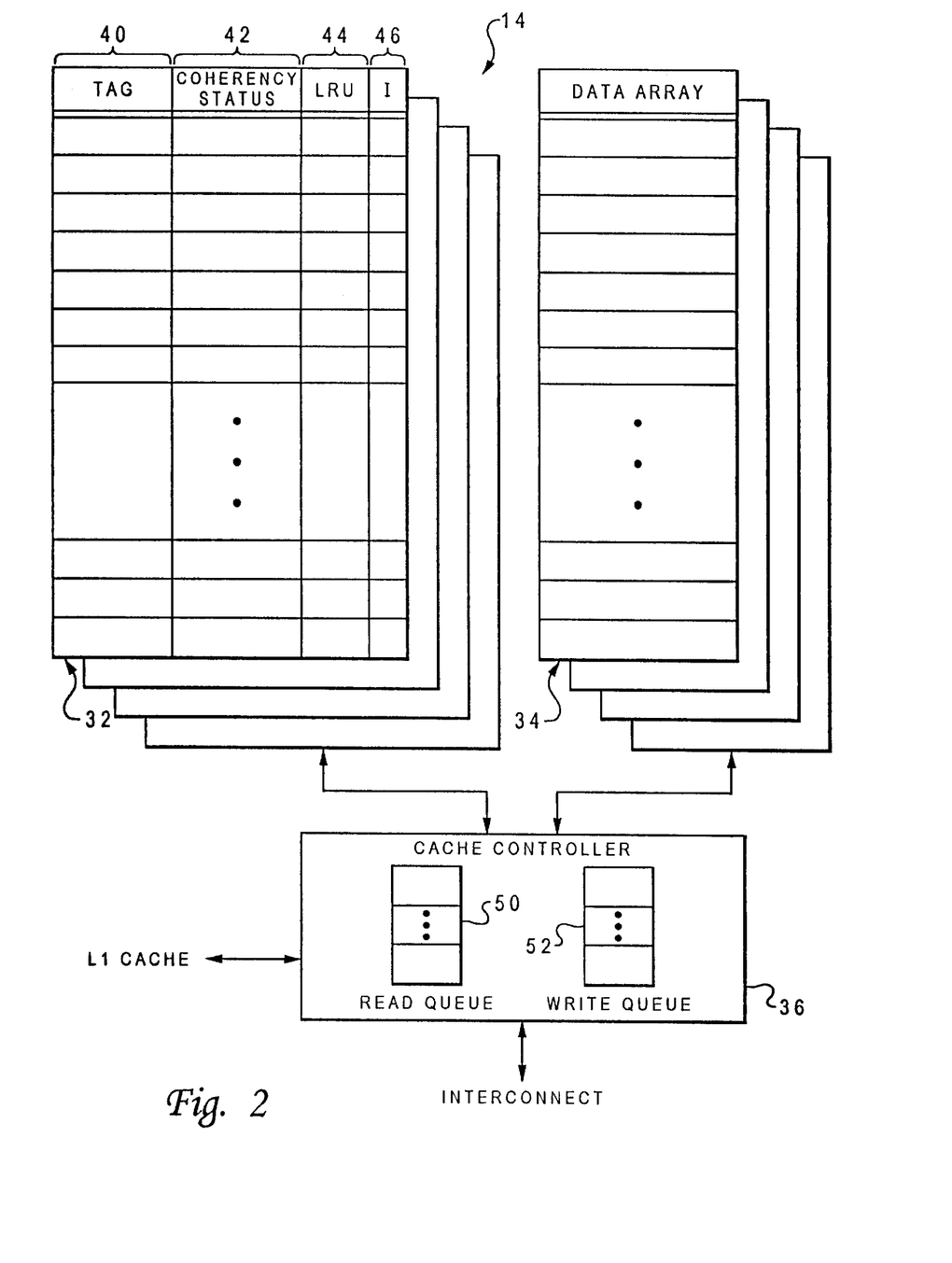
FIG. 2 is a block diagram depicting an illustrative embodiment of a cache in accordance with the present invention.

With reference now to FIG. 2, there is depicted a more detailed block diagram of an illustrative embodiment of an L2 cache 14 in accordance with the present invention. In the illustrative embodiment, L2 cache 14 is an eight-way set associative cache that utilizes 32-bit addresses. Accordingly, data array 34 of L2 cache 14 comprises a number of congruence classes that each contain 8 ways for storing cache lines. As in conventional set associative caches, memory locations in system memory 18 are mapped to particular congruence classes within data array 34 utilizing index bits within the address of the memory location (e.g., bits 20–26 of a 32-bit address).

The cache lines stored within data array 34 are recorded in cache directory 32, which contains one directory entry for each way in data array 34. Each directory entry comprises a tag field 40, coherency status field 42, least recently used (LRU) field 44, and inclusion field 46. Tag field 40 specifies which cache line is stored in the corresponding way of data array 34 by storing the tag bits (e.g., bits 0–19) of the system memory address of the cache line. As discussed in detail below with reference to FIG. 3, coherency status field 42 indicates the coherency status of the data stored in the corresponding way of data array 34 utilizing predefined bit combinations. LRU field 44 indicates how recently the corresponding way of data array 34 has been accessed relative to the other ways of its congruence class, thereby indicating which cache line should be cast out of the congruence class in response to a cache miss. Finally, inclusion field 46 indicates whether or not the cache line stored in the corresponding way of data array 34 is also stored in the associated L1 cache 12.

Still referring to FIG. 2, L2 cache 14 further includes cache controller 36, which manages storage and retrieval of data within data array 34 and updates to cache directory 32 in response to signals received from the associated L1 cache 12 and transactions snooped on interconnect 16. As illustrated, cache controller 36 contains a read queue 50 and a write queue 52 from which cache controller 36 performs updates to cache directory 32 and accesses to data array 34. For example, in response to receiving a read request from the associated L1 cache 12, cache controller 36 places the read request in an entry within read queue 50. Cache controller 36 services the read request by supplying the requested data to the associated L1 cache 12 and thereafter removes the read request from read queue 50. As another example, cache controller 36 may snoop a transaction initiated by another of L2 caches 14a–14n indicating that a remote processor 10 intends to modify its local copy of a specified cache line. In response to snooping this transaction, cache controller 36 places a request to read cache directory 32 in read queue 50 in order to determine if the specified cache line is resident in data array 34. If so, cache controller 36 places an appropriate response on interconnect 16 and, if necessary, inserts a directory write request in write queue 52, that when serviced, updates the coherency status field associated with the specified cache line. Although FIG. 2 illustrates an embodiment in which only one read queue and one write queue are utilized, it should be understood that the number of queues employed by cache controller 36 is a matter of design choice and that cache controller 36 may employ separate queues for cache directory accesses and data array accesses.

L3 cache 15a is constructed like the L2 cache 14 shown in FIG. 2 with minor exceptions. In particular, the cache controller of L3 cache 15a is not connected to L2 cache 14a by inter-cache connections, but, as noted above, is instead connected to interconnect 16 in parallel with L2 cache 14a such that the cache controller of L3 cache 15a snoops all transactions issued on interconnect 16 by L2 cache 14a.

Figure 3:
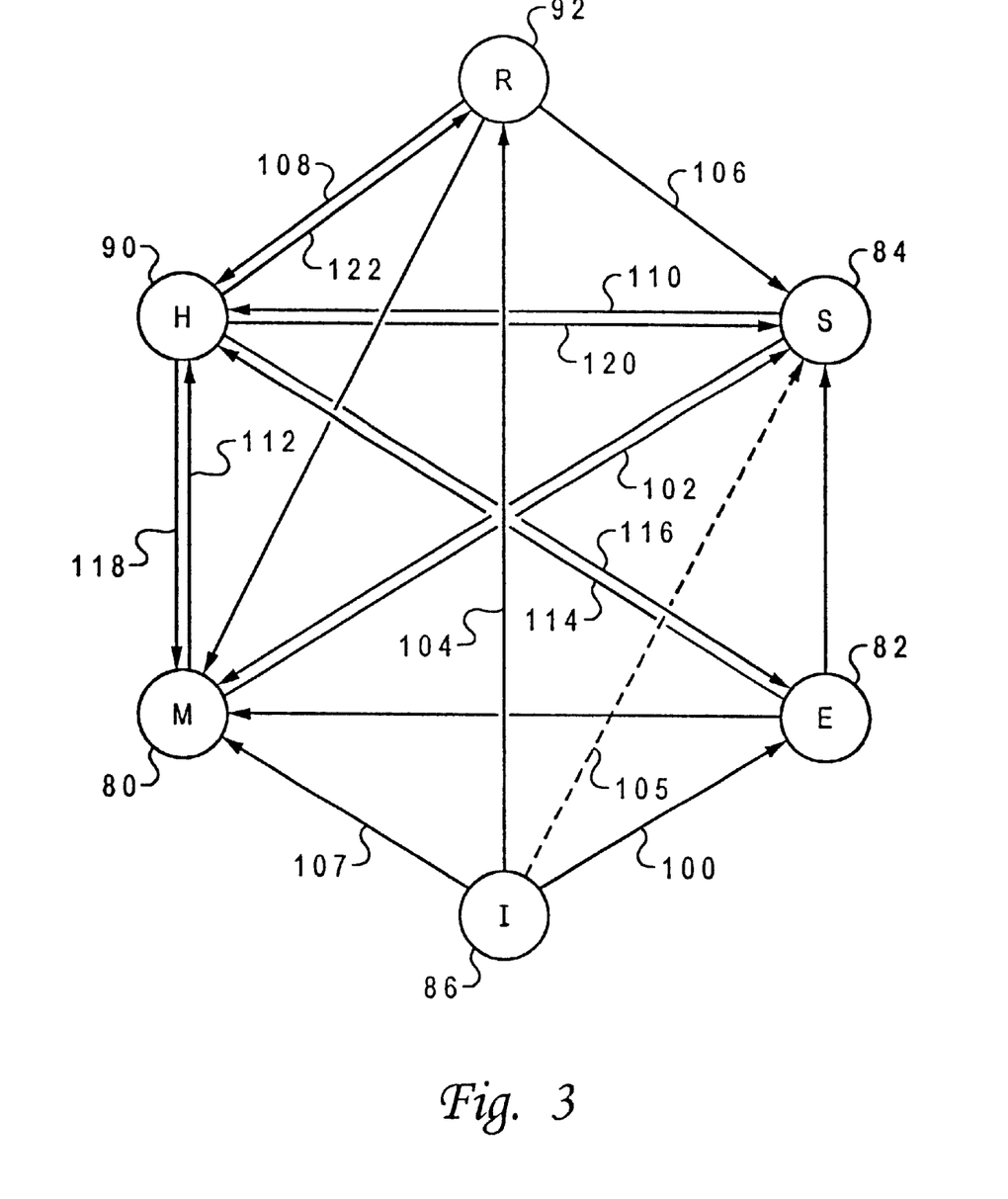
FIG. 3 is a state diagram depicting an illustrative embodiment of the HR-MESI cache coherency protocol.

With reference now to FIG. 3, there is depicted an illustrative embodiment of an HR-MESI cache coherency protocol in accordance with the present invention. The illustrated HR-MESI protocol is preferably implemented by the lowest level of in-line cache in the memory hierarchy (i.e., L2 caches 14a–14n) and, with minor variations, by any lower level lookaside caches (i.e., L3 cache 15a). Higher level caches preferably implement protocol subsets such as the MESI protocol, the H-MESI protocol, which is described in U.S. patent application Ser. No. 09/024,610, incorporated herein by reference, or the R-MESI protocol, which is described in U.S. patent application Ser. No. 08/839,557, incorporated herein by reference. It should be understood, however, that alternative embodiments of data processing system 8 can implement the HR-MESI protocol at each level of cache in the memory hierarchy at the expense of additional inter-cache communication traffic.

As shown in FIG. 3, the HR-MESI cache coherency protocol includes the conventional modified (M), exclusive (E), shared (S), and invalid (I) states of the MESI protocol, which are respectively identified by reference numerals 80, 82, 84, and 86. In addition, the HR-MESI cache coherency protocol of the present invention includes hovering (H) state 90, which indicates that the address tag stored in the associated tag field 40 is valid but that the data item (e.g., cache line or cache sector) stored in the corresponding way of data array 34 is invalid, and R state 92, which indicates which cache, out of multiple caches that store copies of a data item, has most recently received the shared data item via a transaction on interconnect 16.

In a preferred embodiment, coherency status field 42 of each entry of each L2 cache directory 32 is initialized to I state 86 at power-on to indicate that both tag field 40 and the data stored in the corresponding way of data array 34 are invalid. L1 and L3 cache directory entries are similarly initialized to the invalid state. Thereafter, the coherency status of a cache line (or cache sector) stored in one of L2 caches 14a–14n or L3 cache 15a in invalid state 86 can be updated to one of M state 80, E state 82, or R state 92, depending upon both the types of memory requests made by processors 10a–10n and the response of the memory hierarchy to those requests.

For example, if processor 10a makes a read request in response to a load instruction, L1 cache 12a first makes a determination of whether or not the requested data is resident in L1 cache 12a. In response to a hit in L1 cache 12a, L1 cache 12a simply supplies the requested data to processor 10a. However, in response to miss in L1 cache 12a, L1 cache 12a forwards the read request to L2 cache 14a via inter-cache connections. In response to a hit in L2 cache 14a, the requested data is supplied by L2 cache 14a to L1 cache 12a, which stores the requested data in association with the appropriate coherency status and forwards the requested data to processor 10a.

If, however, the read request misses in both L1 cache 12a and L2 cache 14a, cache controller 36 of L2 cache 14a presents the read request as a transaction on interconnect 16, which is snooped by each of L2 caches 14b–14n as well as by L3 cache 15a. In response to snooping the read request on interconnect 16, cache controller 36 in each of L2 caches 14b–14n determines if the requested data is resident in its data array 34 or the associated one of L1 caches 12b–12n. The cache controller of L3 cache 15a similarly determines if the read request hits in the L3 cache directory. If none of L2 caches 14b–14n, L1 caches 12b–12n, and L3 cache 15a stores the requested data, each of L2 caches 14a–14n and L3 cache 15a returns a null response to L2 cache 14a, which then requests the data from system memory 18. When the requested data is returned to L2 cache 14a from system memory 18, cache controller 36 forwards the requested data to L1 cache 12a, stores the requested data in its data array 34, and updates the coherency status field 42 associated with the way storing the requested data from I state 86 to E state 82, as indicated by reference numeral 100. As in the conventional MESI protocol, E state 82 indicates that the associated cache line is valid and is not resident in any other cache at the second level of the memory hierarchy. L3 cache 15a similarly samples the requested data and stores the requested data in E state 82.

If the data requested by processor 10a is not resident in L1 cache 12a, L2 cache 14a, or L3 cache 15a, but is stored, for example, in L1 cache 12n in M state 80, cache controller 36 of L2 cache 14n responds to the read request with a modified response and signals L1 cache 12n to push the requested data to L2 cache 14n. Thereafter, L2 cache 14n sources the requested data on interconnect 16. In response to the read request, the coherency status of the requested data in L1 cache 12n and L2 cache 14n is updated to S state 84 as indicated by reference numeral 102. In accordance with the present invention, the coherency status of the way in which the requested data is stored in L2 cache 14a makes a transition from I state 86 to R state 92, as indicated by reference numeral 104. As noted above, R state 92 indicates that the associated data has been most recently referenced by L2 cache 14a and that L2 cache 14a will source the data in response to snooping a request for the data on interconnect 16. When L3 cache 15a snoops the return of the requested data from system memory 18, L3 cache 15a samples the requested data and stores the data in S state 84. The transition between I state 86 and S state 84 shown at reference numeral 105 is represented using dashed-line illustration to indicate that this transition is only applicable to L3 cache 15a. Those skilled in the art will appreciate from the foregoing example that the same state transitions will be made in alternative embodiments of the present invention that do not support modified intervention; however, in those alternative embodiments, the requested data is obtained from system memory 18 at the cost of additional access latency.

L2 cache 14a similarly makes a transition from I state 86 to R state 92 in response to receiving either a shared intervention response or a shared response to its read request. L2 cache 14a receives a shared intervention response (and the requested data) if one of L2 caches 14b–14n, for example, L2 cache 14n, stores the requested data in R state 92 or E state 82. In response to the read request, cache controller 36 of L2 cache 14n updates the coherency status of its copy of the requested data from R state 92 to S state 84 as indicated by reference numeral 106. If none of L2 caches 14b–14n stores the requested data in R state 92, but at least one stores the requested data in S state 84, the L2 cache 14 storing the requested data in S state 84 responds to the read request with a shared response, leaving its copy of the requested data in S state 84. In response to receipt of only a shared response, L2 cache 14a retrieves the requested data from system memory 18 and stores the requested data in R state 92. In both cases, L3 cache 15a samples the requested data and stores the data in S state 84.

If L2 cache 14a issues a "read with intent to modify" request on interconnect 16 indicating that processor 10a desires to acquire exclusive use of a memory location for the purpose of modifying it, the requested data is obtained from L3 cache 15a, a remote L2 cache 14, or system memory 18 as described above. However, when the requested cache line is obtained, L1 cache 12a and L2 cache 14a store the requested cache line in M state 80 as illustrated at reference numeral 107. In addition, because the "read with intent to modify" transaction indicates that other copies of the requested cache line will become stale, L3 cache 15a and remote L1 and L2 caches must indicate that their copies of the requested cache line are invalid. In L1 caches 12b–12n, any copies of the requested cache line are simply marked as invalid. However, the coherency status of copies of the requested cache line stored in L3 cache 15a and L2 caches 14b–14n are not updated to I state 86 as in conventional multiprocessor data processing systems that utilize cross-invalidation (XI). Instead, in accordance with an important aspect of the present invention, each of L2 caches 14b–14n and L3 cache 15a that store a copy of the requested cache line updates the coherency status field 42 associated with its copy from any of R state 92, S state 84, M state 80, or E state 82 to H state 90, as indicated by reference numerals 108, 110, 112, and 114, respectively. As noted above, H state 90 indicates that the tag stored in tag field 40 remains valid, but that the associated cache line within data array 34 is invalid. Entries in L2 and L3 cache directories are similarly updated to H state 90 in response to other snooped transactions that require data to be invalidated, including kills (i.e., transactions that explicitly invalidate a specified data block), flushes (i.e., transactions that invalidate a specified data block and copy any modified data to system memory), dclaims (i.e., transactions that invalidate copies of a cache line marked as shared in remote caches in response to a local copy of the cache line becoming modified in response to a store), etc.

As indicated by reference numerals 116 and 118, a cache directory entry can make a transition from H state 90 to E state 82 or M state 80, respectively, depending upon the types of transactions received by the cache. For example, a directory entry of L2 cache 14a that is in H state 90 makes a transition to E state 82 in response to processor 10a making a read request that (after missing in both L1 cache 12a and L2 cache 14a) receives a null response from L3 cache 15a and L2 caches 14b–14n. E state 82 signifies that the data retrieved from system memory 18 will, of all L2 caches 14a–14n, be stored only in L2 cache 14a. If, on the other hand, processor 10a indicates an intent to store data to a way of L1 cache 12a that is in H state 90, L1 cache 12a indicates that intent to L2 cache 14a, which then issues a "read with intent to modify" transaction on interconnect 16. As discussed above, copies of the requested cache line stored in L3 cache 15a and L2 caches 14b–14n are updated to H state 90 in response to snooping the "read with intent to modify" transaction, and copies of the requested cache line stored in L1 caches 12b–12n are marked as invalid. Once the requested cache line is obtained, the coherency status of the cache line in L2 cache 14a and L1 cache 12a is set to M state 80 to signify that the cache line is valid, but is not coherent with system memory 18.

A cache directory entry in H state 90 can also be updated to S state 84 as illustrated at reference numeral 120. As described above, each of L2 caches 14a–14n snoops all transactions issued on interconnect 16. If one of L2 caches 14a–14n, for example, L2 cache 14a, snoops a transaction issued by another of L2 caches 14b–14n that includes an updated (i.e., valid) copy of data that is stored in L2 cache 14a in H state 90, cache controller 36 of L2 cache 14a samples the data from interconnect 16, stores the snooped data in data array 34, and updates the associated coherency status field 42 from H state 90 to S state 84. In this manner the present invention permits a cache directory entry in H state 90 to be updated to S state 84 without the associated processor 10 making a data request or the cache initiating a transaction on interconnect 16. Of course, in the above scenario L2 cache 14a also provides a response to the snooped transaction, if a response is required to maintain coherency. For example, if the snooped transaction is a read request, L2 cache 14a must provide a shared response indicating its intention to sample the requested data so that the requesting L2 cache stores the requested data in R state 92 rather than E state 82. Transactions on interconnect 16 that can be snooped in this way to refresh invalid data associated with a valid address tag include read transactions, write transactions, data writebacks to system memory 18 due to cache line castouts, etc.

A cache directory entry in H state 90 may also be updated to R state 92 in response to a number of different request/response scenarios. For example, if processor 10a makes a read request that misses in L1 cache 12a and results in a tag hit in L2 cache 14a and if the coherency status field 42 associated with the matching tag is in H state 90, cache controller 36 of L2 cache 14a issues a read transaction on interconnect 16. In response to receipt of a shared intervention response, shared response, or modified response to the read transaction from L3 cache 15a and L2 caches 14b–14n, cache controller 36 of L2 cache 14a updates the coherency status field 42 associated with the requested data from H state 90 to R state 92, as illustrated at reference numeral 122.

More importantly, a cache directory entry in H state 90 can be updated to R state 92 without the associated processor requesting data. For example, following a "read with intent to modify" request by processor 10a, L1 cache 12a and L2 cache 14a store the requested data in M state 80, while the coherency status of any copies of the cache line in L3 cache 15a and L2 caches 14b–14n is set to H state 90. If the requested data is subsequently selected for replacement from L2 cache 14a, for example, in response to a read miss, cache controller 36 of L2 cache 14a issues a deallocation write transaction on interconnect 16 in order to store the requested data to system memory 18. In response to snooping this write transaction, the cache controller of L3 cache 15a samples the data, stores the data in its L3 data array, and updates the associated coherency status field from H state 90 to R state 92, such that L3 cache 15a can subsequently source the data in response to receipt of a read or "read with intent to modify" request.

State transitions that may be made in the illustrative embodiment of the HR-MESI cache coherency protocol depicted in FIG. 3 are summarized below in Table I.

TABLE I

| State Transition | Causes | Notes |
| --- | --- | --- |
| I → E | processor read with null response | "processor read" denotes a read request by the associated (i.e., local) processor |
| I → R | (1) processor read with shared intervention (ShI) response; | |

TABLE I-continued

| State Transition | Causes | Notes |
| --- | --- | --- |
| | (2) processor read with shared response; (3) processor read with modified response | |
| I → S | processor read with any response except null | L3 lookaside cache only; L2 transitions to R as noted above |
| I → M | processor "read with intent to modify" (rwitm) | |
| E → S | snooped read | source intervention data |
| E → M | processor rwitm | |
| E → H | snooped data invalidate | snooped data invalidates include rwitm, dclaim, kill, flush, etc |
| R → S | snooped read | source intervention data |
| R → M | processor rwitm | issue dclaim on interconnect |
| R → H | snooped data invalidate | |
| S → M | processor rwitm | issue dclaim on interconnect |
| S → H | snooped data invalidate | |
| M → S | snooped read | source data if modified intervention is supported |
| M → H | snooped data invalidate | if snooped transaction is rwitm, source data if modified intervention is supported |
| H → E | processor read with null response | |
| H → R | (1) processor read with ShI response; (2) processor read with shared response; (3) processor read with modified response; (4) snooped write issued by a local cache controller | |
| H → S | snooped read or write issued by a remote cache controller | |
| H → M | processor rwitm | |

In accordance with the present invention, the above-described HR-MESI cache coherency protocol can be expanded to include additional states that support additional functionality. For example, referring now to FIG. 4, there is depicted a state diagram of an illustrative embodiment of an HRT-MESI cache coherency protocol. If implemented, the HRT-MESI protocol is preferably utilized by the lowest level of in-line cache in the memory hierarchy, which in the embodiment illustrated in FIG. 1 includes L2 caches 14a–14n. Any lower level lookaside caches such as L3 cache 15a preferably implement the HR-MESI protocol, while higher level caches preferably employ a subset protocol of the HR-MESI protocol, for example, one of the H-MESI, R-MESI or MESI protocols. In addition to the states within the HR-MESI protocol described hereinabove, the HRT-MESI cache coherency protocol shown in FIG. 4 includes tagged (T) state 94. As described in detail in U.S. patent application Ser. No. 09/024,393, which is incorporated herein by reference in its entirety, T state 94 indicates that an associated cache line has been modified by a processor other than the local processor, but has not been written back to (i.e., is not coherent with) system memory. As such, T state 94 is treated by the local processor much like S state 84 and is treated like M state 80 with regard to snoops on the interconnect.

Figure 4:
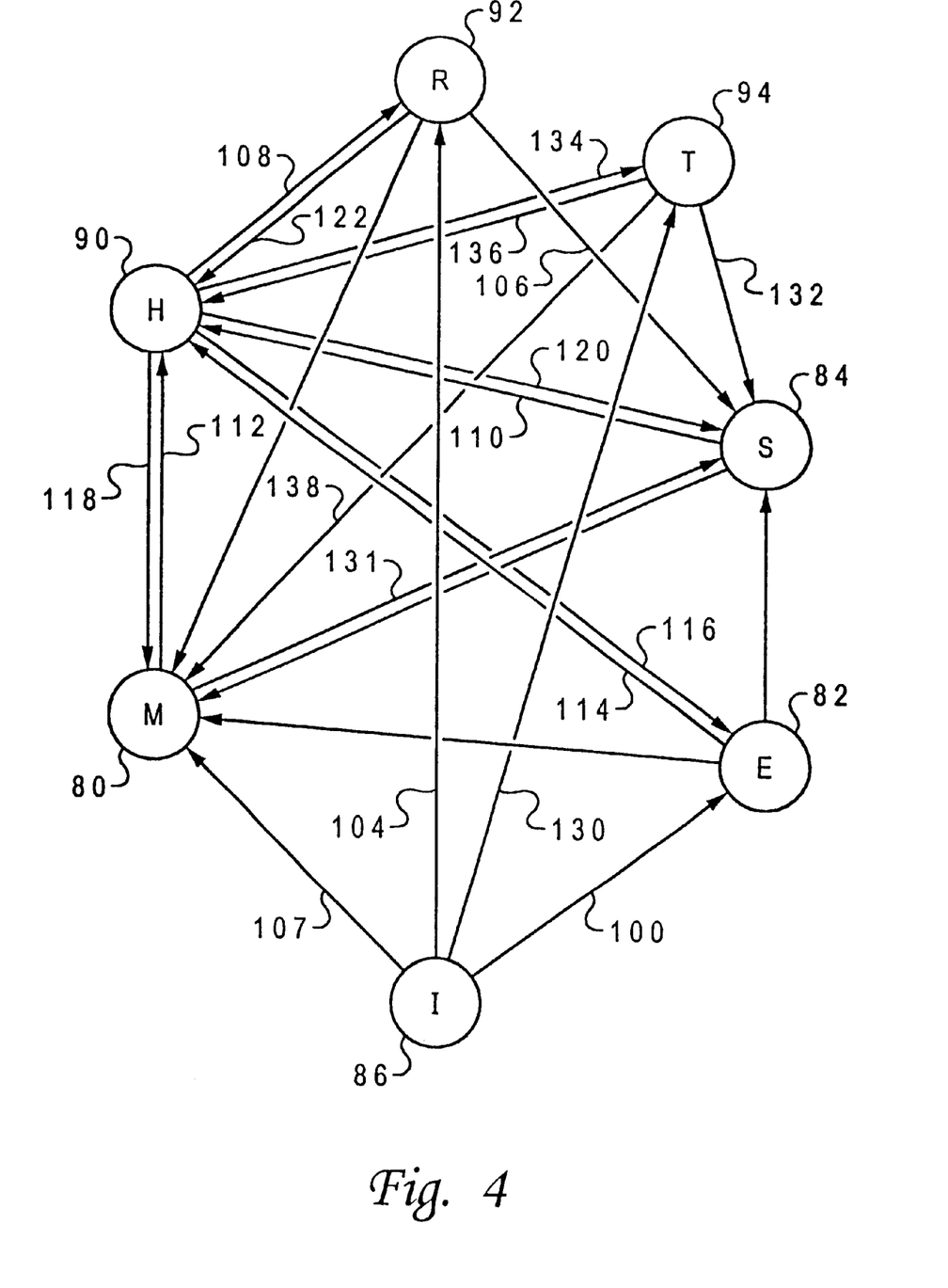
FIG. 4 is state diagram illustrating an illustrative embodiment of the HRT-MESI cache coherency protocol.

As illustrated in FIG. 4 at reference numerals 130 and 134, a cache line can make a transition from I state 86 or H state 90 to T state 94 in response to a read request receiving a modified response. For example, if L2 cache 14a makes a read request for a cache line stored by L2 cache 14n in M state 80, L2 cache 14n sources the requested cache line to L2 cache 14a via modified intervention as discussed above. As before, the copy of the requested cache line in L2 cache 14n is updated to S state 84 as shown at reference numeral 131. L2 cache 14a, on the other hand, stores the requested cache line in T state 94. Thereafter, in response to a read request for the modified cache line by L2 cache 14b, L2 cache 14a sources the requested cache line by modified intervention and updates the coherency status of its copy of the modified cache line to S state 84 as shown at reference numeral 132. This process can be repeated additional times such that the L2 cache 14 that most recently accessed the modified cache line stores the cache line in T state 94, while others of L2 caches 14a–14n store the modified cache line in S state 84. In this manner, one of L2 caches 14a–14n is "tagged" to signify that it is temporarily responsible for sourcing the cache line to other caches by modified intervention and for writing back the cache line to system memory 18.

Importantly, when an L2 cache 14 storing a cache line in T state 94 sources data on interconnect 16 by modified intervention, the snoop mechanism (e.g., memory controller) of system memory 18 does not sample and store the modified data, but instead ignores the transaction, freeing up system memory bandwidth. Thus, modified cache lines in T state 94 are written back to system memory 18 only when required, for example, in response to an L2 cache line castout or a snooped transaction that requires the modified cache line to be pushed to system memory 18. It is possible, of course, that a modified cache line in T state 94 may never be written back to system memory 18. Consider, for example, a scenario in which a processor 10a issues a "read with intent to modify" specifying a cache line stored by L2 cache 14n in T state 94. In response to the "read with intent to modify" request, L2 cache 14n and other L2 caches 14 storing the specified cache line in S state 84 all update their copies of the specified cache line to H state 90, as indicated at reference numerals 136 and 110, respectively. Because the cache line data is invalidated by the transition to H state 90, the need to write back the specified cache line to system memory 18 is obviated.

As illustrated at reference numeral 138, a cache line in T state 94 can also make a transition to M state 80 in response to the local processor making a "read with intent to modify" request. Because the local L2 cache 14 stores the requested cache line, no request transaction for the data is issued on interconnect 16. Instead, the local L2 cache 14 issues a dclaim transaction on interconnect 16, which instructs the other L2 caches 14 to invalidate their copies of the requested cache line by updating the associated coherency status to H state 90.

State transitions that may be made in the illustrative embodiment of the HRT-MESI cache coherency protocol depicted in FIG. 4 are summarized below in Table II.

TABLE II

| State Transition | Causes | Notes |
|---|---|---|
| I → E | cpu read with null response | |
| I → R | (1) cpu read with shared intervention (ShI) response; | |

TABLE II-continued

| State Transition | Causes | Notes |
|---|---|---|
| I → T | (2) cpu read with shared response; cpu read with modified response | |
| I → M | cpu "read with intent to modify" (rwitm) | |
| E → S | snooped read | source intervention data |
| E → M | cpu rwitm | |
| E → H | snooped data invalidate | snooped data invalidate = rwitm, dclaim, kill, flush, etc. If snooped transaction is rwitm, response ShI and source data |
| R → S | snooped read | source intervention data |
| R → M | cpu rwitm | issue dclaim on interconnect |
| R → H | snooped data invalidate | if rwitm, respond ShI and source data |
| S → M | cpu rwitm | issue dclaim on interconnect |
| S → H | snooped data invalidate | |
| M → S | snooped read | source data if modified intervention is supported |
| M → H | snooped data invalidate | if snooped transaction is rwitm, source data if modified intervention is supported |
| T → S | snooped read | respond modified and source intervention data |
| T → M | cpu rwitm | issue dclaim on interconnect |
| T → H | snooped data invalidate | if rwitm, respond modified and source data |
| H → E | cpu read with null response | |
| H → R | (1) cpu read with ShI response; (2) cpu read with shared response; and (3) snooped write issued by a local cache controller | |
| H → S | snooped read or write issued by a remote cache controller | |
| H → T | cpu read with modified response | |
| H → M | cpu rwitm | |

A further enhancement that may be made to a cache coherency protocol including H state 90 is the addition of one or more derivative H states that indicate historical coherency status information. For example, the HRT-MESI and HR-MESI cache coherency protocols described above can be modified to include an $H_R$ state. Like H state 90 the $H_R$ state signifies that the associated cache line is invalid and that the associated address tag is valid. The $H_R$ state also indicates that, prior to invalidation of its data, the associated cache line was stored exclusively (e.g., in M state 80 or E state 82) or in a coherency state capable of sourcing intervention data (e.g., R state 92 or T state 94). Consider, for example, a scenario in which L2 cache 14a stores a cache line in one of M state 80, E state 82, R state 92, or T state 94. If L2 cache 14n issues a "read with intent to modify" request for the cache line on interconnect 16, L2 cache 14a issues an appropriate response and updates the coherency status of the cache line to the $H_R$ state (rather than H state 90). Thereafter, in response to L2 cache 14n issuing a writeback transaction (e.g., a cache line deallocation or a snoop push) on interconnect 16 that stores the cache line to system memory 18, L2 cache 14a samples and stores the cache line data and updates the coherency status of the cache line to R state 92. Use of the HR state thus permits shared intervention to be maintained following deallocation of a modified cache line, thereby decreasing data access latency.

Figure 5:
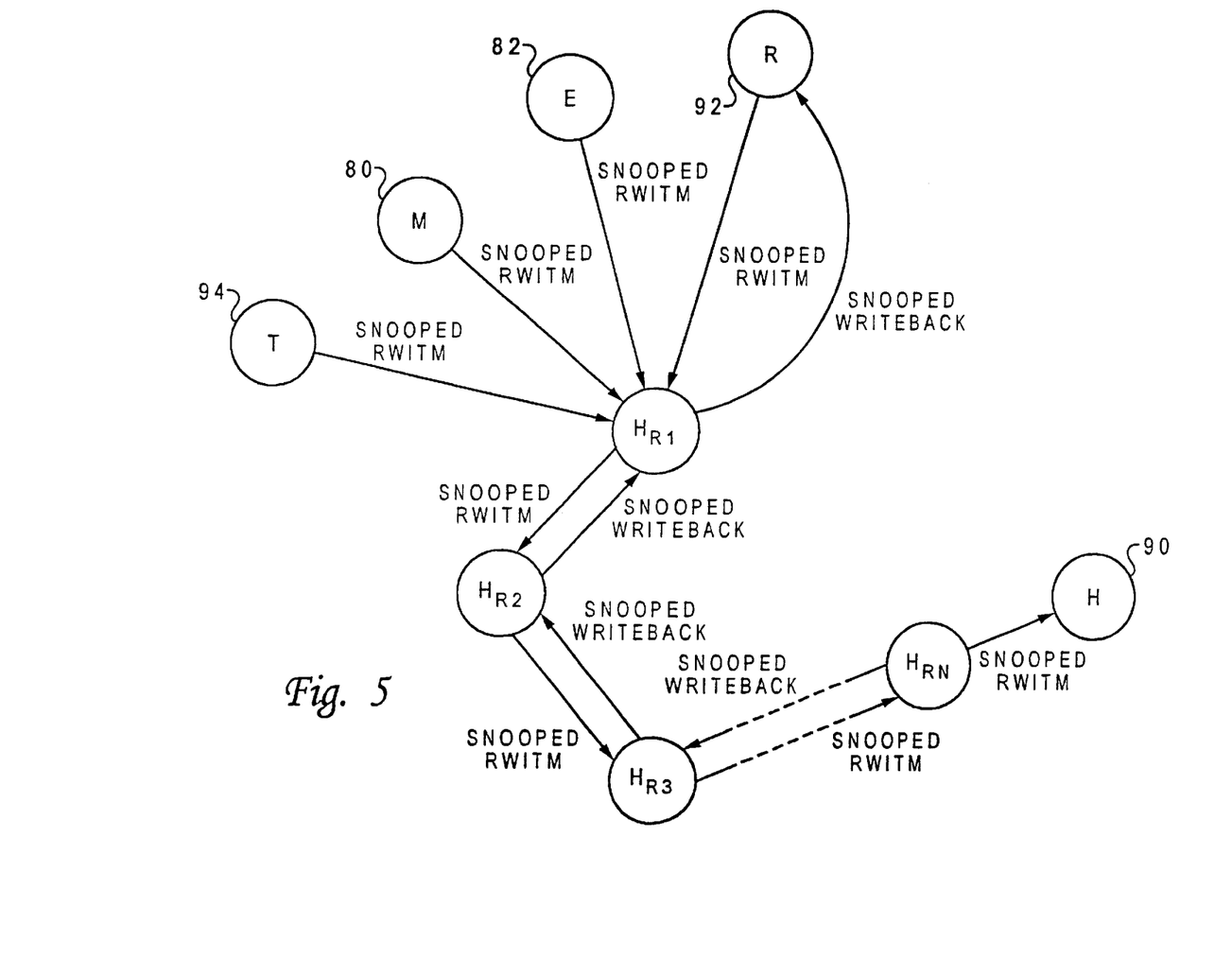
FIG. 5 is a state diagram depicting the utilization of derivative H states to maintain N levels of historical cache coherency information.

Next, assume that L2 cache 14a stores a copy of a cache line in the $H_R$ state and L2 cache 14n stores a copy of the same cache line in a state from which L2 cache 14n can source intervention data. If L2 cache 14b issues a "read with intent to modify" request for the cache line on interconnect 16, L2 cache 14n issues an appropriate response, sources the requested cache line by intervention, and then updates the coherency status of its copy of the requested cache line to the $H_R$ state. In response to snooping an intervention response containing the updated cache line, L2 cache 14a updates the coherency status of its copy of the cache line from the $H_R$ state to H state 90. Alternatively, as illustrated in FIG. 5, additional levels of historical information can be retained by inserting one or more additional derivative states ($H_{R2}$, $H_{R3}$, etc.) between the top-level derivative state $H_{R1}$ and H state 90. Thus, instead of transitioning to H state 90 in response to snooping the intervention response issued by L2 cache 14n, L2 cache 14a would transition from the $H_{R1}$ state to the $H_{R2}$ state. Thereafter, in response to snooping a writeback transaction containing the relevant cache line, L2 cache 14a would update the coherency status of its copy of the cache line to the $H_{R1}$ state. In this manner, N levels of historical coherency status information can be implemented to increase the likelihood that at least one cache can source a requested cache line by intervention.

As indicated in FIG. 5 by dashed-line illustration, other variations of a cache coherency protocol including N levels of historical coherency status information are possible. In particular, selected ones or all of the lower level historical states ($H_{R2}$, $H_{R3}$, ... $H_{RN}$) be updated directly to S state 84 in response to the snooping of a writeback of the relevant cache line since the cache that stores the cache line in the top-level $H_{R1}$ state will be able to source the cache line from R state 92 by shared intervention.

As has been described, the present invention provides an improved method and system for maintaining cache coherency in a multiprocessor data processing system. The improved cache coherency protocol provided by the present invention permits an invalid data item stored by a cache in association with a valid address tag to be automatically updated with a valid data item without the local processor issuing an explicit read or write request. In this manner, data invalidated by the activity of remote processors can be refreshed prior to the data being accessed by the local processor, thereby substantially reducing data access latency by eliminating the need to retrieve the data from a remote cache or system memory.

Data access latency is also substantially reduced by the cache coherency protocol of the present invention through the support of shared intervention, which supplies data stored in shared state from a remote cache rather than system memory. According to another aspect of the present invention, a cache coherency protocol can be expanded to include a tagged (T) state that promotes efficient utilization of system memory bandwidth by allocating responsibility for writing back modified data to system memory. A cache coherency protocol in accordance with the present invention can also maintain historical coherency status information through the inclusion or one or more derivative states. Such derivative states enable the responsibility for sourcing data by intervention to be transferred from a first cache to a second cache in response to deallocation by the first cache of a cache line containing the data.

While the present invention has been particularly shown and described with reference to illustrative embodiments, it will be understood by those skilled in the art that various changes in form and detail may be made therein without departing from the spirit and scope of the invention. For example, the HR-MESI and HRT-MESI cache coherency protocols could be modified to eliminating I state 86 because that state is only utilized to initialize directory entries at power-on and is never re-entered from another state. If I state 86 were eliminated, at power-on the coherency status field of each L2 directory entry would be initialized to H state 90, and the tag field of each L2 directory entry would be initialized to a tag value that is unique at least within the same congruence class.

What is claimed is:

1. A method of maintaining cache coherency in a data processing system including a system memory, a plurality of processors, and a plurality of caches coupled to an interconnect, said method comprising:

in a first cache among said plurality of caches, storing a first data item in association with an address tag indicating an address of said first data item and setting a coherency indicator in said first cache to a first state that indicates that said address tag is valid and that said first data item is invalid in said first cache; and in response to said first cache receiving a data transfer on said interconnect associated with said address indicated by said address tag while said coherency indicator is set to said first state, said data transfer including a second data item that is modified with respect to a corresponding data item in said system memory, storing said second data item in said first cache in association with said address tag in place of said first data item and updating said coherency indicator to a second state indicating that said second data item is valid and modified with respect to said corresponding data item in system memory and that said first cache is responsible, among all of said plurality of caches, for writing back said second data item to said system memory.

2. The method of claim 1, and further comprising the step of writing back said second data item from said first cache to said system memory.

3. A method of maintaining cache coherency in a data processing system including a system memory, a plurality of processors, and a plurality of caches coupled to an interconnect, said method comprising:

in a first cache among said plurality of caches, storing a first data item in association with an address tag indicating an address of said first data item and setting a coherency indicator in said first cache to a first state that indicates that said address tag is valid and that said first data item is invalid in said first cache;

in response to said first cache receiving a data transfer on said interconnect associated with said address indicated by said address tag while said coherency indicator is set to said first state, said data transfer including a second data item that is modified with respect to a corresponding data item in said system memory, storing said second data item in said first cache in association with said address tag in place of said first data item and updating said coherency indicator to a second state indicating that said second data item is valid and modified with respect to said corresponding data item in system memory and that said first cache is responsible, among all of said plurality of caches, for writing back said second data item to said system memory; and writing back said second data item from said first cache to said system memory only in response to deallocation by said first cache of a cache line containing said second data item while said coherency indicator is set to said second state.

4. The method of claim 1, said step of setting said coherency indicator to a first state comprising the step of setting said coherency indicator to said first state in response to one of said plurality of processors indicating an intention to store to said address indicated by said address tag.

5. The method of claim 1, wherein said plurality of caches includes a second cache, said method further comprising the step of:

in response to receipt at said first cache of a request by said second cache for said second data item while said coherency indicator is set to said second state, placing said second data item on said interconnect and updating said coherency indicator in said first cache to a third state indicating that said second data item is shared; and storing said second data item in said second cache in association with a coherency indicator set to said second state.

6. A cache for supporting cache coherency in a data processing system including a system memory, a plurality of processors, and a plurality of caches coupled to an interconnect, said cache comprising:

data storage;

tag storage that stores an address tag indicating an address of a first data item contained in said data storage;

a coherency indicator having at least first and second states, said first state indicating that said address tag is valid and that said first data item is invalid; and means, responsive to receiving a data transfer from said interconnect associated with said address indicated by said address tag while said coherency indicator is set to said first state, said data transfer being initiated by another of said plurality of caches and including a second data item that is modified with respect to a corresponding data item in said system memory, for storing said second data item in said cache in association with said address tag and for updating said coherency indicator to a second state indicating that said second data item is valid and that said cache is responsible for writing back said second data item to said system memory.

7. The cache of claim 6, and further comprising means for writing back said second data item from said cache to said system memory.

8. A cache for supporting cache coherency in a data processing system including a system memory, a plurality of processors, and a plurality of caches coupled to an interconnect, said cache comprising:

data storage;

tag storage that stores an address tag indicating an address of a first data item contained in said data storage;

a coherency indicator having at least first and second states, said first state indicating that said address tag is valid and that said first data item is invalid;

means, responsive to receiving a data transfer from said interconnect associated with said address indicated by said address tag while said coherency indicator is set to said first state, said data transfer being initiated by another of said plurality of caches and including a second data item that is modified with respect to a corresponding data item in said system memory, for storing said second data item in said cache in association with said address tag and for updating said coherency indicator to a second state indicating that said second data item is valid and that said cache is responsible for writing back said second data item to said system memory; and means, responsive only to deallocation by said cache of a cache line containing said second data item while said coherency indicator is set to said second state, for writing said second data item from said cache to said system memory.

9. The cache of claim 6, said means for setting said coherency indicator to a first state comprising means for setting said coherency indicator to said first state in response to one of said plurality of processors indicating an intention to store to said address indicated by said address tag.

10. The cache of claim 6, said cache further comprising:

means, responsive to receipt at said cache of a request by another of said plurality of caches for said second data item while said coherency indicator is set to said second state, for placing said second data item on said interconnect and updating said coherency indicator in said cache to a third state indicating that said second data item is shared.

11. A data processing system, comprising:

an interconnect;

a plurality of processors;

a plurality of caches coupled to said plurality of processor and to said interconnect, wherein a first cache among said plurality of caches includes:

data storage;

tag storage that stores an address tag indicating an address of a first data item contained in said data storage;

a coherency indicator having at least first and second states, wherein said first state indicates that said address tag is valid and that said first data item is invalid; and means, responsive to receiving a data transfer from said interconnect associated with said address indicated by said address tag while said coherency indicator is set to said first state, said data transfer being initiated by another of said plurality of caches and including a second data item that is modified with respect to a corresponding data item in said system memory, for storing said second data item in said first cache in association with said address tag and for updating said coherency indicator to a second state indicating that said second data item is valid and that said first cache is responsible for writing back said second data item to said system memory.

12. The data processing system of claim 11, said first cache further comprising means for writing back said second data item from said first cache to said system memory.

13. A data processing system, comprising:

an interconnect;

a plurality of processors;

a plurality of caches coupled to said plurality of processor and to said interconnect, wherein a first cache among said plurality of caches includes:

data storage;

tag storage that stores an address tag indicating an address of a first data item contained in said data storage;

a coherency indicator having at least first and second states, wherein said first state indicates that said address tag is valid and that said first data item is invalid; and means, responsive to receiving a data transfer from said interconnect associated with said address indicated by said address tag while said coherency indicator is set to said first state, said data transfer being initiated by another of said plurality of caches and including a second data item that is modified with respect to a corresponding data item in said system memory, for storing said second data item in said first cache in association with said address tag and for updating said coherency indicator to a second state indicating that said second data item is valid and that said first cache is responsible for writing back said second data item to said system memory; and means, responsive only to deallocation by said first cache of a cache line containing said second data item while said coherency indicator is set to said second state, for writing said second data item from said first cache to said system memory.

14. The data processing system of claim 11, said means for setting said coherency indicator to a first state comprising means for setting said coherency indicator to said first state in response to one of said plurality of processors indicating an intention to store to said address indicated by said address tag.

15. The data processing system of claim 13, said first cache further comprising:

means, responsive to receipt at said first cache of a request by another of said plurality of caches for said second data item while said coherency indicator is set to said second state, for placing said second data item on said interconnect and updating said coherency indicator in said first cache to a third state indicating that said second data item is shared.

16. The method of claim 1, and further comprising concurrently storing said second data item in a second cache among said plurality of caches while said first cache stores said second data item in said second state.

17. The cache of claim 6, wherein said cache is a first cache and wherein said second state further imprecisely indicates that a second cache among said plurality of caches concurrently stores said second data item while said first cache stores said second data item in said second state.

18. The data processing system of claim 11, wherein said second state further imprecisely indicates that a second cache among said plurality of caches concurrently stores said second data item while said first cache stores said second data item in said second state.

19. The method of claim 1, and further comprising:

in response to said first cache detecting a data transfer on said interconnect initiated by another device in said data processing system, said data transfer including a third data item associated with said address, replacing said first data item in said first cache with said third data item and setting said coherency indicator to a third state indicating that said third data item is valid and that said first cache is responsible, among all of said plurality of caches, for supplying said third data item by shared intervention in response to a request.

20. The cache of claim 6, wherein said coherency indicator has a third state, and wherein said cache further comprises means, responsive to detecting a data transfer on said interconnect initiated by another device in said data processing system, said data transfer including a third data item associated with said address, for replacing said first data item in said data storage with said third data item and for setting said coherency indicator to a third state indicating that said third data item is valid and that said first cache is responsible, among all of said plurality of caches, for supplying said third data item by shared intervention in response to a request.

21. The data processing system of claim 11, wherein said coherency indicator has a third state, and wherein said first cache further comprises means, responsive to detecting a data transfer on said interconnect initiated by another device in said data processing system, said data transfer including a third data item associated with said address, for replacing said first data item in said data storage with said third data item and setting said coherency indicator to a third state indicating that said third data item is valid and that said first cache is responsible, among all of said plurality of caches, for supplying said third data item by shared intervention in response to a request.

* * * * *